United States Patent Office 3,429,667
Patented Feb. 25, 1969

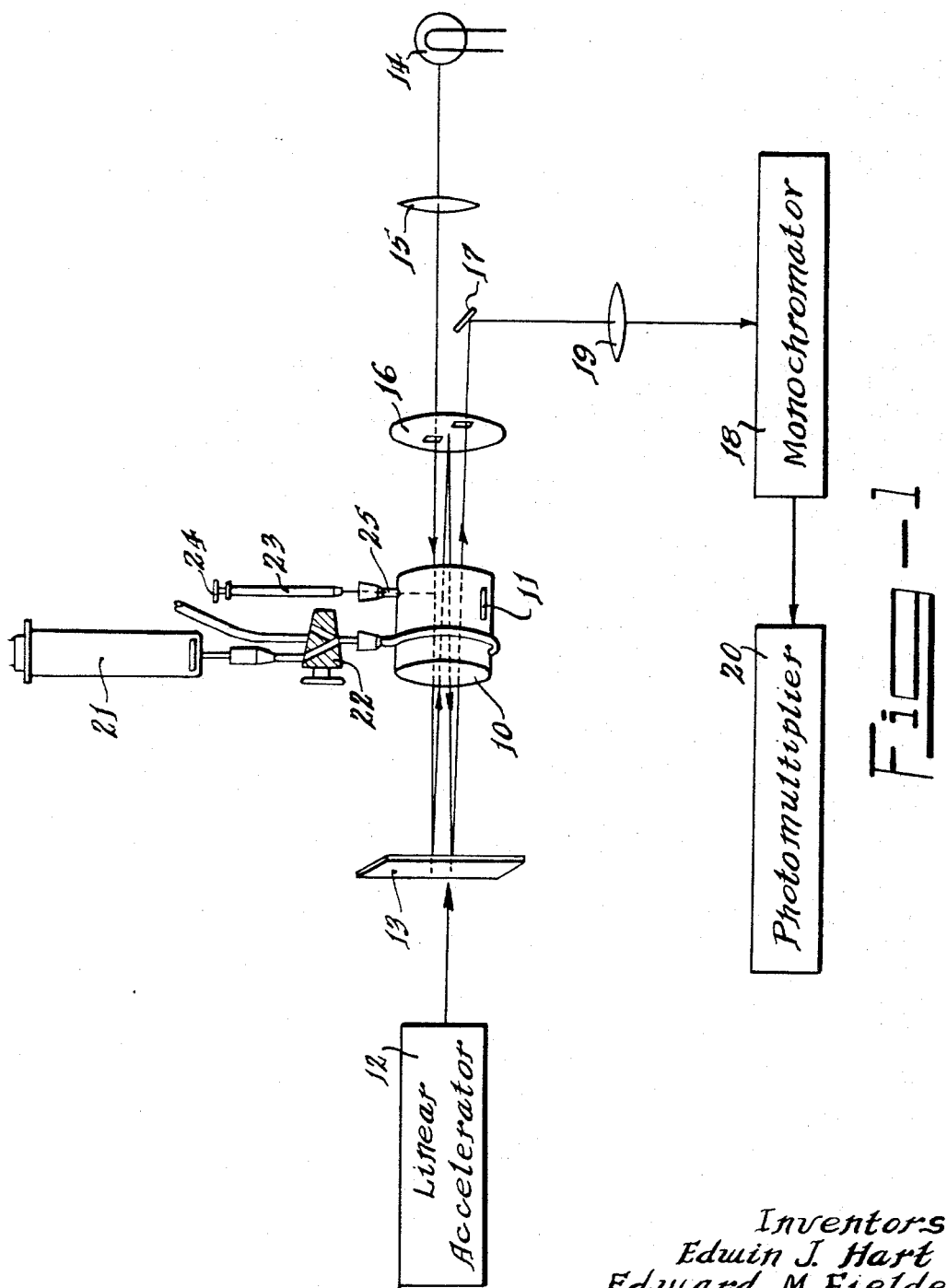

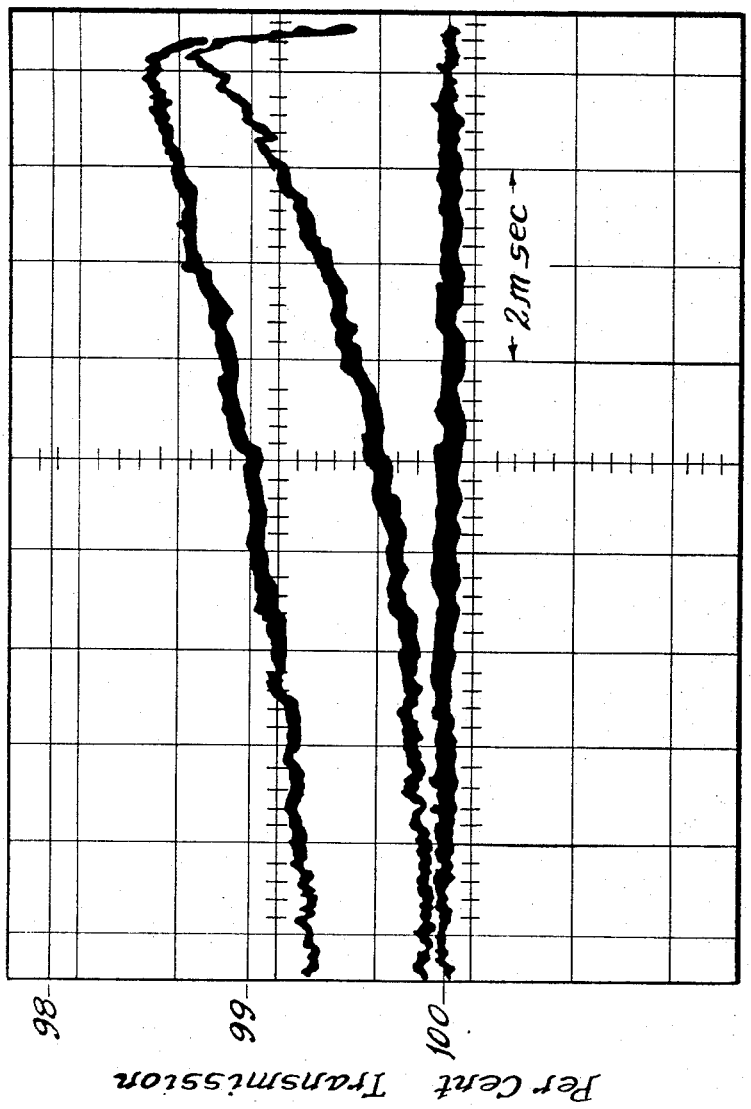

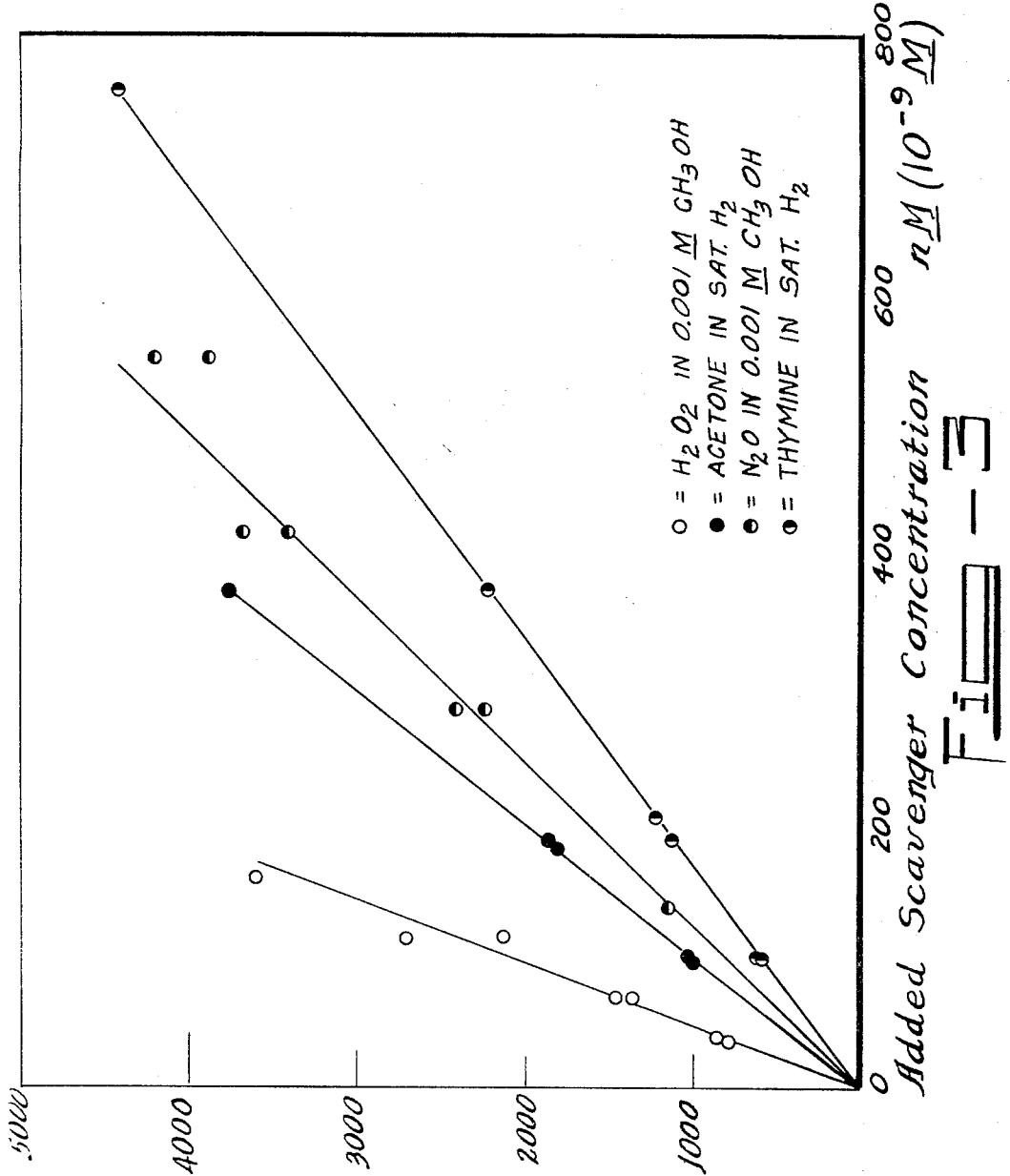

3,429,667
METHOD OF QUANTITATIVE ANALYSIS OF REDUCIBLE SUBSTANCES WITH HYDRATED ELECTRONS
Edwin J. Hart, Hinsdale, and Edward M. Fielden, Elmhurst, Ill., assignors to the United States of America as represented by the United States Atomic Energy Commission
Filed May 2, 1966, Ser. No. 547,032
U.S. Cl. 23—230
Int. Cl. G01n 33/18, 27/00
3 Claims The invention described herein was made in the course of, or under, a contract with the United States Atomic Energy Commission.

This invention relates to an analysis technique for determination of the amount of reducible substances in aqueous solution. In more detail, the invention relates to a method of determining the amount of oxygen and other reducible substances in water when present in very small amounts.

For many of the applications of modern science, information concerning the amount of minute amounts of reducible substances in a sample is required. For example, this technique can be used industrially to determine the amount of oxygen in water, to analyze wash solutions used in plating with platinum or rhodium for these elements, or to determine the purity of water used in the television industry.

Other analytical methods having equivalent sensitivity such as gas chromatography and activation analysis are, of course, also available and in many situations give very satisfactory results. The present invention, however, is of such great versatility that the quantitative determination of small concentrations of substances that cannot otherwise be determined is possible. In addition, the present method in some cases is effective in the presence of impurities which would interfere with other types of analysis.

The process is very sensitive and capable of determining concentrations down to $10^{-9}$ molar (1.0 nM or 1.0 nanomolar). However, the identity of the material in question must be known. Also the reducible substances must be the only one present in the sample, although, of course, in some cases it is possible to eliminate interfering substances in preliminary processing.

It is accordingly an object of the present invention to develop a novel method for analyzing samples to determine the amount of reducible substances contained therein.

It is a more specific object of the invention to develop a method for determining submicromolar quantities of oxygen and other reducible substances in aqueous solution.

According to the present invention, the hydrated electron, designated $e_{aq}^-$ is employed as an analytical reagent for the determination of reducible substances. The hydrated electron was first postulated in the early 1950's to help explain theoretical aspects of water radiolysis. Its existence was finally proven in the early 1960's. Because the lifetime of the hydrated electron is measured in microseconds, its discovery was delayed until the recent development of adequate fast reaction techniques employing high electron current pulse accelerators.

The hydrated electron is formed directly by the interaction of radiation on water and also by secondary reactions in the water. The hydrated electron disappears by reacting with another $e_{aq}^-$ in accordance with the following reaction $$e_{aq}^- + e_{aq}^- + 2H_2O \rightarrow H_2 + 2O\text{-}H$$

At an $[e_{aq}^-]$ of $10^{-8}$ M the theoretical half-life of the hydrated electron due to this reaction alone is 10 msec. (10 milliseconds).

The hydrated electron is the most reactive and powerful reducing agent known. A typical reaction is $$e_{aq}^- + O_2 \rightarrow O_2^-$$

the half-life of the hydrated electron being 0.35 msec. in the presence of $10^{-7}$ M oxygen. Thus the hydrated electron disappears much more quickly in the presence of an oxidizing agent than in its absence. Since the hydrated electron is deeply colored in a normally transparent region of the spectrum, it is easy to follow the disappearance of the hydrated electron through absorption spectrophotometry.

Thus, to practice the present invention, hydrated electrons are generated in a sample of the solution containing an unknown amount of a known reducible substance by subjecting the sample to a low-intensity pulse of irradiation capable of producing hydrated electrons such as pulsed electron beams, gamma rays, X-rays or light of the proper wave length, and simultaneously passing a beam of light through the sample. The hydrated electrons generated by the pulse absorb some of the light and the change in intensity of the light passing through the sample is monitored by a conventional monochromator/photomultiplier/oscilloscope combination. The decay rate of the hydrated electron is then compared with that of solutions of known concentrations to determine the unknown concentration.

The invention will next be described with particular reference to the accompanying drawings wherein:

FIG. 1 is a diagram of apparatus used in carrying out this invention.

FIG. 2 is a representation of traces formed upon an oscilloscope screen used in the practice of this invention.

FIG. 3 is a graph showing calibration curves for several reducible substances to which this method can be applied.

Referring now to FIG. 1 of the drawing, the apparatus includes a silica irradiation cell 10 provided with a metal stirrer 11. Pulses of electrons from a linear accelerator 12 are directed through a thin mirror 13 into the irradiation cell 10. Light from a tungsten lamp 14 is focused through lens 15 and through cell 10 onto mirror 13 from which it is reflected to concave mirror 16. Only four light passes are shown in the drawing, although in the experiments to be described hereinafter sixteen light passes were employed to increase sensitivity of the method. After the final pass the light is reflected by a mirror 17 onto the slits of a monochromator 18 by lens 19. The light of selected wavelength is then passed into a photomultiplier 20, the signal from which is amplified and displayed on the screen of an oscilloscope as shown in FIG. 2.

A matrix solution is introduced into cell 10 from a glass syringe 21 through a two-way stopcock 22. The sample is then introduced into the cell by means of a micropipette 23 provided with a plunger 24 connected to cell 10 through joint 25. To empty the cell micropipette 23 is disconnected and an inert gas line is connected to joint 25. Two-way stopcock 22 is turned to connect waste line 26 to cell 10 and the solution in cell 10 is blown out of the cell by the inert gas.

To carry out the process a standard matrix solution is first prepared. About 700 ml. of triply distilled water is given a preliminary degassing in a one-liter evacuation chamber in order to remove most of the oxygen and carbon dioxide. Then 1.0 N sodium hydroxide is added to make the solution 0.001 N. The solution will then have a pH of 11. The solution need not be carbonate-free, but it is advisable to minimize this ion because it forms an absorbing transient ion by reaction with the OH radical. Next the solution is saturated with hydrogen, degassed (cycle repeated twice) and finally saturated with hydrogen. This solution is then forced into hydrogen-purged 100-ml. syringes 21. The residual oxygen and hydrated electron scavengers (materials which react with hydrated electrons) are removed by $Co^{60}$ $\gamma$-ray irradiation to a total dose of $\sim 10^{-5}$ $Me_{aq}^-$ (about 2 kilorads). A final "in situ" irradiation is always employed on the matrix solution.

This procedure must be essentially followed to attain sensitivity in the submicromolar range. For example, it is essential that interfering impurities such as dissolved oxygen be eliminated to the greatest extent practical. Distillation, degassing and saturation with hydrogen as well as irradiation accomplish this result. The oxygen content is finally reduced to about 0.5 nM by in situ irradiation.

It is also essential that the pH of the solution be between about 11 and 12. In the first place, it is only in alkaline solution containing dissolved hydrogen that the hydrated electron exists long enough to work with. At a pH between 7 and 10, $OH^-$ ions are not present in the solution in sufficient concentration to convert H atoms to hydrated electrons, which is an important secondary reaction for the formation of hydrated electrons. At a pH above 12, the added impurities resulting from the addition of alkali reduce the sensitivity of the method.

Standard solutions of various scavengers such as oxygen, hydrogen peroxide, nitrous oxide, thymine and acetone are prepared either in the pre-irradiated matrix or pre-irradiated hydrogen-saturated water at concentrations of about 10 to 50 $\mu M$.

A 13.2-ml. irradiation cell 10 (2.2 cm. diameter, 4 cm. length) is mounted in a multiple reflection assembly as described in an article in the Journal of Physical Chemistry, volume 69, page 53 (1964). In normal practice this cell is used with 16 light passes giving an optical path length of 64 cm.

The matrix, stored in syringe 21, is introduced into the helium-purged cell through stopcock 22. After two complete replacements, micropipette 23 containing an aliquot of the standard solution is connected to the irradiation cell. Because traces of oxygen and other impurities may have been introduced into the cell with the matrix solution, it is X-ray-pulse-irradiated until a constant decay of $e_{aq}^-$ results—typically with a half-life of 8–10 msec. (See top curve of FIG. 2.) This treatment usually requires about twenty, 7 nM $e_{aq}^-$ pulses (nM= $10^{-9}$ M). After this final irradiation, the aliquot of the standard solution is injected into cell 10 and the solution mixed by agitating stirrer 11 several times with a magnet.

The cell is irradiated with 16 mev. tungsten X-rays generated with an ARCO electron accelerator 12. A pulse of up to 100 $\mu$sec. duration is employed. For example, one to two rad electron or X-ray pulses of 1 to 10 $\mu$sec. duration are required for the production of 6 to 12 nM $e_{aq}^-$. Any similarly pulsed X-ray beam of 150 to 200 kev. would serve equally well, since there is no rigid requirement of uniform irradiation. However, the amount of radiation employed must be of low intensity, for example one or two rads, to attain sensitivity sufficient to determine quantities of materials in the submicromolar range. With X-ray pulses of lower energy, more pulses may be required to clean out the scavenger between runs. Alternatively, a steady X-ray or $\gamma$-ray source may be substituted for the pulsed X-rays for this purpose.

A beam of light from a tungsten lamp 14 is continuously passed through the cell. The intensity of the light passing through the reaction cell is monitored by a conventional monochromator/photomultiplier/oscilloscope combination. The photomultiplier can be an R.C.A. 7102 with associated preamplifier. The rise time of the preamplifier could be controlled by switching in various integrating capacitors. This has the effect of removing the high-frequency components of the random noise fluctuations present in the signal. Care is always taken to ensure that the band width of the electronic circuitry is adequate to display the transient absorption being recorded. In practice the rise time of the recording system was never greater than 5% of the half-life of the transient signal. For example, in the oscilloscope traces of FIG. 2 the rise time (sometimes called response time or integrating time) of the complete recording system was 100 $\mu$sec. and the half-lives of the two decays are 8000 and 2000 $\mu$sec. Reducing the rise time to 10 $\mu$sec. did not affect the experimental half-lives, showing that negligible distortion had been produced by the 100 $\mu$sec. rise time.

Referring now to FIG. 2, the difference in decay of the hydrated electron in the presence of a reducible substance and in its absence is apparent. FIG. 2 was obtained by photographing the oscilloscope screen to obtain three traces. The upper trace shows the change in light transmission of the matrix solution following an electron pulse, the middle trace shows the change in light transmission of a solution containing 13 x $10^{-9}$ M oxygen, and the lower horizontal trace was recorded 30 msec. before the pulse and represents 100% transmission. Decay is from right to left. The wave length of the light selected by the monochromator was 6900 A. and the solution was saturated with hydrogen at a pH of 11.

Similar pictures are made for different oxygen concentrations, the upper and lower traces, of course, remaining substantially the same but the trace showing the presence of oxygen changing its position upwardly or downwardly depending on how much oxygen is present. An unknown oxygen concentration can then readily be determined by comparing the trace obtained therefrom with the traces obtained from known concentrations.

To make the comparison easier a graph can be prepared, plotting the concentration against the difference in the reciprocals of the half-life of the matrix solution and the half-life of the solution containing the reducible substance. The curve obtained by plotting these results is a straight line. Thus it is merely necessary to obtain this difference in the reciprocals of the half-lives from the picture of the traces as from FIG. 2 and read the concentration from the graph. FIG. 3 gives such curves for a number of reducible substances, namely hydrogen peroxide, acetone, $N_2O$, and thymine. The abscissa is the concentration of reducible substance while the ordinate is the difference in the reciprocals of the half-life of the matrix solution and the half-life of the solution containing the reducible substance.

Mechanizing the readout system to eliminate any possible interpretive steps is well within the skill of the art. Since only conventional components would be used in a conventional manner, the required system will not be described in detail. For example, it will be noted that the signal generated by photomultiplier 20 is representative of the intensity of light incident thereon during decay of the hydrated electrons. Although the easiest way to illustrate the invention and the most economical way to practice it is to define reciprocals of the half-lives of the decay curves, as described above in text relating to FIG. 3, in order to determine the concentration of the reducible substance, nevertheless, the curve comparing aspect could be automated as follows. It is noted that the half-life of a decay curve is related to the decay time constant of the curve by a simple expression. The output signal of photomultiplier 20 for the case of the irradiated standard matrix solution may be gated to a logarithm generator which generates an output signal representative of the natural logarithm of its input signal. This signal may be converted to a digital signal by a conventional analog to digital converter and gated to a first binary register where it is stored. The output signal of photomultipler 20 for the case of the irradiated solution containing the reducible substance is also fed to the natural logarithm generator and to the analog to digital converter but is gated to a secondary binary register where it is stored. The output of the second binary register (a digital signal representative of the decay time constant for the case of the irradiated solution containing the reducible substance) is then substracted from the output of the first binary register (a digital signal representative of the decay time constant for the case of the irradiated standard matrix solution). The resultant signal is representative of the concentration of the reducible substance in solution.

It will be appreciated that this invention can be applied to determine the concentrations of many hundreds of different compounds. The rate constants of $e_{aq}^-$ reactions with many organic and inorganic compounds have been determined and this method is applicable to those compounds having a rate constant of greater than about $10^9$ $M^{-1}$ sec.$^{+1}$. A few other compounds and ions having a sufficiently high rate constant are NO, $CO_2$, $Fe(CN_6)^{3-}$, $Cu^{++}$, $Ag^+$, $Zn^{++}$, $Co^{++}$, $Ni^{++}$, $Cd^{++}$, CHCl, $CCl_4$, $CS_2$, $C_6H_5COO^-$, adenosine, cytidine, purine and many others.

It will be understood that the invention is not to be limited to the details given herein but that it may be modified within the scope of the appended claims.

What is claimed is:

1. A method of analyzing an aqueous solution containing a very small quantity of a reducible substance to determine the concentration of said reducible substance, comprising irradiating said solution with a low-intensity pulse of radiation capable of producing hydrated electrons therein, said solution having a pH of 11 to 12 and having been saturated with hydrogen, passing a beam of light through the solution, and comparing the change in transmission of the light as the hydrated electrons decay with a standard.

2. A method of analyzing an aqueous solution containing a very small quantity of a reducible substance to determine the concentration of said reducible substance, comprising preparing a standard matrix solution by degassing distilled water, adjusting the pH of the water to between about 11 and 12 by adding sodium hydroxide thereto, saturating the matrix solution with hydrogen and eliminating hydrated electron scavengers therefrom by irradiation, adding a measured quantity of said aqueous solution containing a very small quantity of a reducible substance to said matrix solution, passing a beam of light through said solution, irradiating said solution with 1 to 2 rads of radiation delivered in a pulse of up to 100 microseconds, to generate hydrated electrons therein, monitoring the change in transmission of the light through the solution as the hydrated electrons decay, and determining the concentration of said reducible substance by comparing the change in transmission of the light through the solution containing the unknown concentration of a reducible substance with the change in transmission of light through solutions containing known concentrations of the reducible substance.

3. In a method of analyzing an aqueous solution containing a very small quantity of a reducible substance to determine the concentration of said reducible substance, the steps of preparing a standard matrix solution by degassing distilled water, adjusting the pH of the water to between about 11 and 12 by adding sodium hydroxide thereto, saturating the matrix solution with hydrogen and eliminating hydrated electron scavengers therefrom by irradiation, adding a measured quantity of said aqueous solution containing a very small quantity of a reducible substance to said matrix solution, passing a beam of light through said solution, irradiating said solution with 1 to 2 rads of radiation delivered in a pulse of up to 100 microseconds, to generate hydrated electrons therein, monitoring the change in transmission of the light through the solution as the hydrated electrons decay, whereby the concentration of said reducible substance may be determined by comparing the change in transmission of the light through the solution containing the unknown concentration of a reducible substance with the change in transmission of light through solutions containing known concentrations of the reducible substance.

References Cited

Hart, E. J. et al., Advances in Chemistry Series, No. 50, pp. 253–262 (Sept. 15, 1965).

Hart, E. J. et al., Journal of Physical Chemistry, vol. 70, pp. 150–6 (January 1966).

MORRIS O. WOLK, *Primary Examiner.*

ELLIOTT A. KATZ, *Assistant Examiner.*

U.S. Cl. X.R.

250—83